United States Patent [19]

Matsuzawa

[11] Patent Number: 4,750,318
[45] Date of Patent: Jun. 14, 1988

[54] BLISTER PACKAGING APPARATUS

[75] Inventor: Kozaburo Matsuzawa, Tokyo, Japan

[73] Assignee: Idemitsu Petrochemical Co., Ltd., Japan

[21] Appl. No.: 86,494

[22] Filed: Aug. 14, 1987

[30] Foreign Application Priority Data

Aug. 21, 1986 [JP] Japan .................................. 61-196289
Oct. 14, 1986 [JP] Japan .................................. 61-24871
Oct. 14, 1986 [JP] Japan .................................. 61-243871
Oct. 14, 1986 [JP] Japan .................................. 61-243872

[51] Int. Cl.$^4$ ............................................ B65B 47/10
[52] U.S. Cl. .......................................... 53/559; 53/560; 83/882
[58] Field of Search ............... 53/559, 560, 561, 454, 53/453; 493/355, 396, 240, 160; 83/883, 884, 882

[56] References Cited

U.S. PATENT DOCUMENTS

| 3,330,092 | 7/1967 | Hill . | |
|---|---|---|---|
| 3,450,256 | 6/1969 | Chandler et al. . | |
| 3,475,878 | 11/1969 | West, Jr. | 53/559 X |
| 3,706,251 | 12/1972 | Wheeler et al. | 83/882 X |
| 3,874,143 | 4/1975 | Braber . | |
| 4,457,199 | 7/1984 | Corcoran | 83/883 X |
| 4,506,495 | 3/1985 | Romagnoli | 53/559 |
| 4,571,924 | 2/1986 | Bahrani | 53/560 X |

FOREIGN PATENT DOCUMENTS 535783 1/1957 Canada .................................. 53/454

Primary Examiner—James F. Coan
Attorney, Agent, or Firm—Andrus, Sceales, Starke & Sawall

[57] ABSTRACT

A blister packaging apparatus comprises a blister forming part for forming a plurality of blisters in a thermoplastic resin sheet, an automatic material supplying part for automatically supplying materials into the blisters of the thermoplastic resin sheet, a metal foil member adhering part for adhering a metal foil member to the thermoplastic resin sheet so as to cover openings of the blisters accommodating the materials, a half-cutting part comprising at least one circular blade which is fixed in a non-rotational state and has a blade formed on an entire circumference thereof for forming a half-cut line in the thermoplastic resin sheet for facilitating separation of the blisters, and a curl reforming part for reforming a curl in the thermoplastic resin sheet on which the metal foil member is adhered.

6 Claims, 10 Drawing Sheets

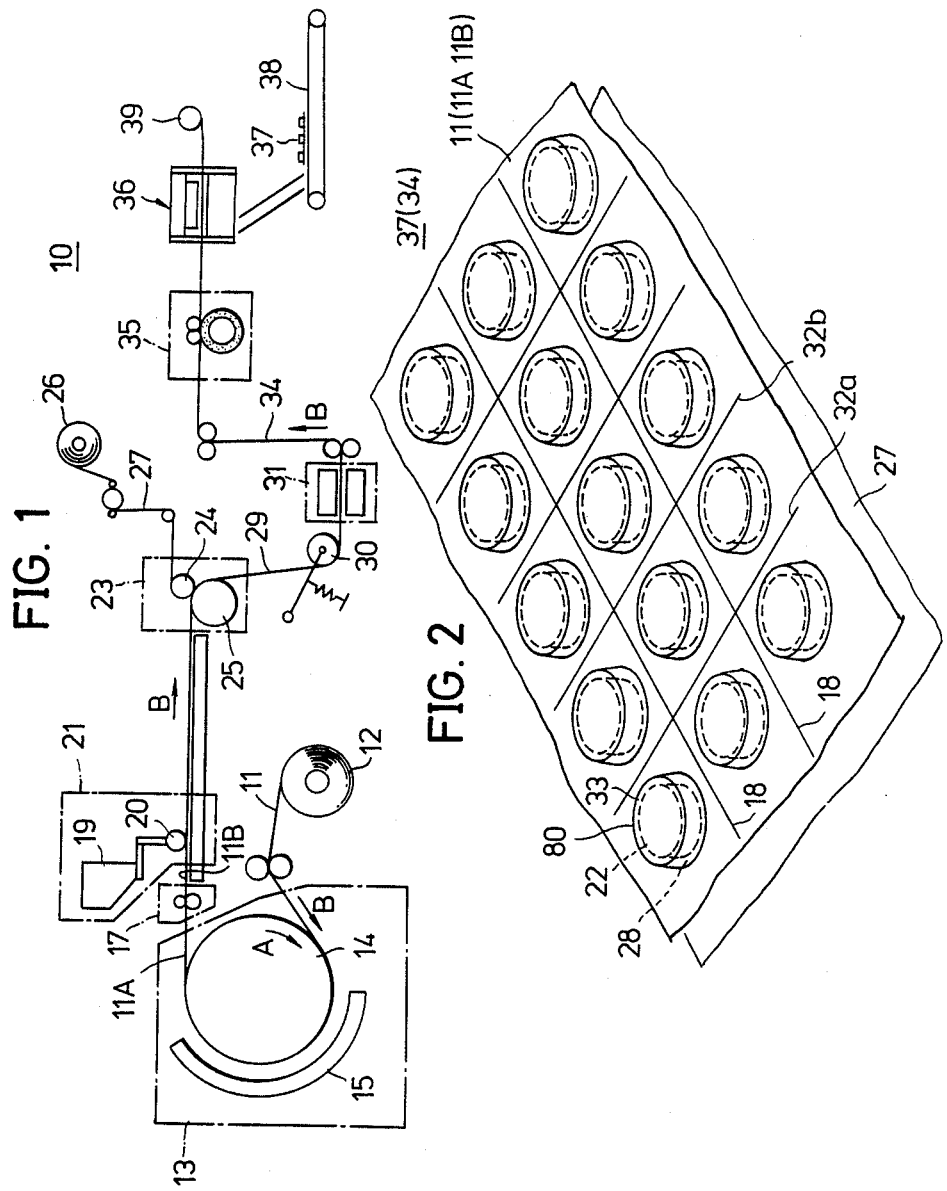

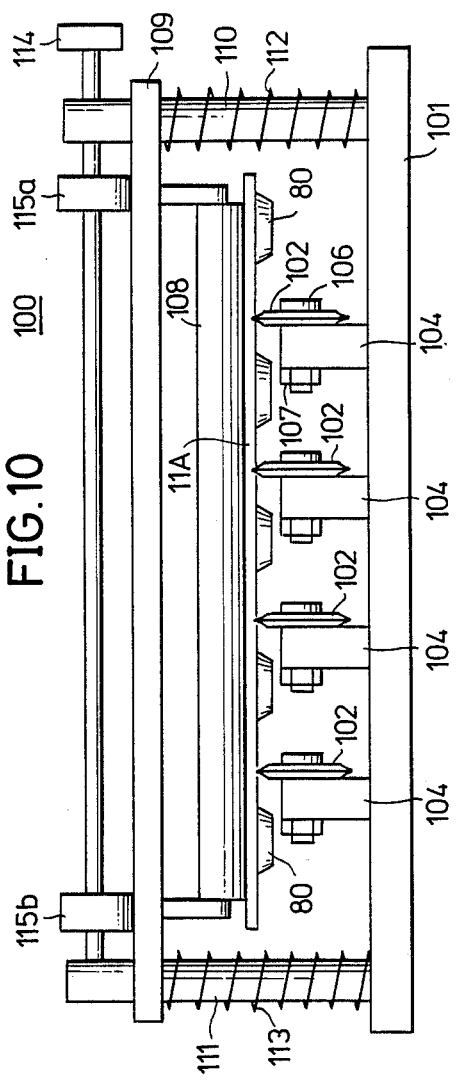
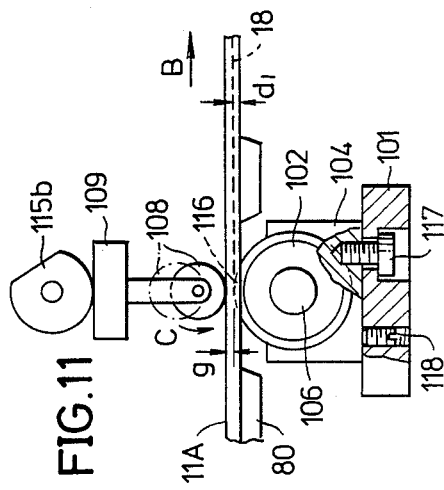
FIG.10
FIG.11

BLISTER PACKAGING APPARATUS

BACKGROUND OF THE INVENTION

The present invention generally relates to blister packaging apparatuses, and more particularly to a blister packaging apparatus which can use a packaging material such as a polypropylene sheet.

A blister package which utilizes blisters formed in a thermoplastic resin sheet is popularly used in packaging medicine tablets, medicine capsules, confectioneries, medical supplies, mechanical parts and the like. In such a blister package, a slit (half-cut line) is formed in the sheet for every one or a plurality of blisters, so as to facilitate the separation of the blisters.

Conventionally, a polyvinyl chloride sheet (hereinafter simply referred to as a PVC sheet) is used for the sheet of the blister package. However, there are problems in that chlorine gas is generated during a thermal process and the moistureproofing provided by the PVC sheet is insufficient. For this reason, the use of a polypropylene sheet for the blister package is recently being considered. However, the polypropylene sheet is more resilient than the PVC sheet, and it is difficult for a blade to cut into the resilient polypropylene sheet to form the half-cut line.

The half-cut line is conventionally formed by pushing an elongated blade, for example, against the sheet so as to cut into the sheet. This method is effective with respect to the PVC sheet, but in the case of the polypropylene sheet, the elongated blade does not satisfactorily cut into the polypropylene sheet and it is impossible to form a desired half-cut line.

There is also a conventional method of moving a blade having a triangular tip along a direction parallel to a surface of the sheet so as to form the half-cut line. According to this method, it is possible to form the half-cut line in the polypropylene sheet. However, because of the triangular shape of the blade, there actually are the following problems.

Firstly, the serviceable life of the blade is short because the tip end of the blade is sharp and the blade wears out quickly because of the large resistance due to friction during the half-cutting.

Secondly, it is difficult to smoothly carry out the half-cutting due to the vibration of the blade caused by the sharp tip end of the blade, the large resistance due to friction during the half-cutting and the abrupt resistance due to friction acting on the blade when the blade cuts into the sheet.

Thirdly, it is impossible to carry out the half-cutting at a high speed due to the large vibration of the blade.

Fourthly, when the blade wears out due to the friction, it is necessary to remove the worn blade, mount a new blade and then adjust the half-cutting quantity of the new blade, and the maintenance is troublesome to carry out.

On the other hand, the blister is formed by drawing a corresponding portion of the sheet into a concave pocket in a drum surface by suction, and a top portion of the blister tends to become thinner than other portions of the blister. Furthermore, since a suction hole is located at a bottom surface of the concave pocket, that is, at a position confronting the top portion of the blister, the thin top portion of the blister is partially sucked into the suction hole and a small conical projection is formed thereby on the top portion of the blister.

The small conical projection on the top portion of the blister is not only undesirable from the point of view of the external appearance of the blister package, but also causes problems when stacking such blister packages on top of one another. In other words, the blister packages are often stacked, but when the small conical projection is formed on the top portion of the blister, the small conical projection of a lower blister package may make contact with and damage a bottom of the blister of an upper blister package, because the bottom of the blister is often simply covered by an aluminum foil. The damage to the aluminum foil covering the bottom of the blister is undesirable from the point of view of quality control, especially in the case where medicine tablets and the like are contained in the blister package.

SUMMARY OF THE INVENTION

Accordingly, it is a general object of the present invention to provide a novel and useful blister packaging apparatus in which the problems described heretofore are eliminated.

Another and more specific object of the present invention is to provide a blister packaging apparatus which uses a circular blade and carries out a half-cutting with respect to a sheet by fixing the circular blade in a non-rotatable state. According to the blister packaging apparatus of the present invention, the resistance due to friction during the half-cutting is reduced compared to the conventional apparatus and the blade does not vibrate. For this reason, it is possible to stably form a half-cut line in the sheet with a high accuracy. In addition, every time a portion of the circular blade wears out due to friction, it is possible to rotate the circular blade by a predetermined angle so as to use a new unused portion of the circular blade, and the serviceable life of the circular blade is long.

Still another object of the present invention is to provide a blister packaging apparatus which uses a plurality of circular blades arranged in a line so that surfaces of the circular blades lie on a single plane, and the circular blades are moved a distance slightly longer than a separation of two mutually adjacent circular blades so as to cut and form by the circular blades half-cut line portions which connect to form a continuous half-cut line. According to the blister packaging apparatus of the present invention, it is possible to carry out the half-cutting at a high speed compared to the case where the entire length of the half-cut line is cut by a single circular blade.

A further object of the present invention is to provide a blister packaging apparatus which uses a blister forming drum having concave pockets in a surface thereof, where each concave pocket is formed with one or a plurality of suction holes only in a peripheral wall thereof. According to the blister packaging apparatus of the present invention, it is possible to form blisters having no small conical projection on top portions of the blisters.

Other objects and further features of the present invention will be apparent from the following detailed description when read in conjunction with the accompanying drawings.

BRIEF DESCRIPTION OF THE DRAWINGS

FIG. 1 generally shows the construction of an embodiment of the blister packaging apparatus according to the present invention;

FIG. 2 is a perspective view showing a portion of a blister package produced by the apparatus shown in FIG. 1;

FIG. 10 shows a longitudinal direction half-cut line forming mechanism viewed from a sheet feeding direction;

FIG. 11 is a side view of the mechanism shown in FIG. 10;

DETAILED DESCRIPTION

Figure 3:
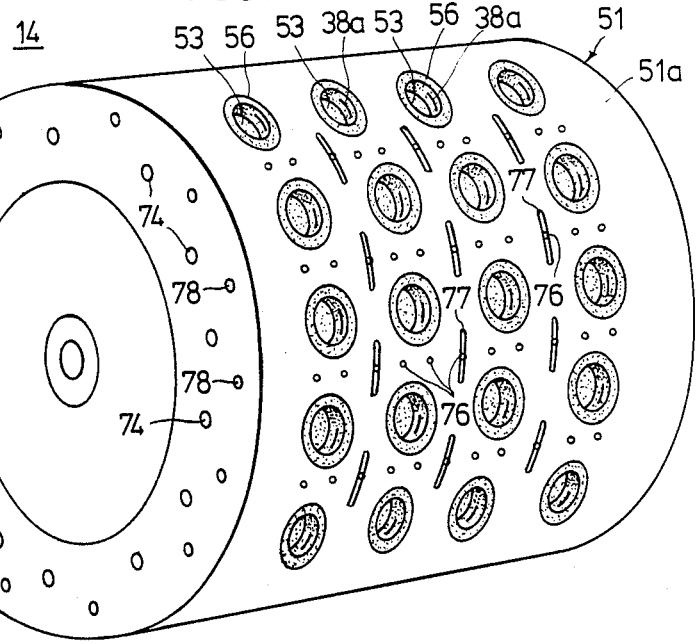
FIG. 3 is a perspective view showing a blister forming drum of the apparatus shown in FIG. 1.

FIG. 1 shows an embodiment of the blister packaging apparatus. In a blister packaging apparatus 10 shown in FIG. 1, a polypropylene sheet 11 is drawn out of a roll 12 and enters a blister forming part 13. The sheet 11 makes contact with a peripheral surface of a blister forming drum 14 which rotates in a direction A, and is transported while being heated by a heater 15. The sheet 11 is drawn into concave pockets in the peripheral surface of the drum 14 by suction, and blisters 80 shown in FIG. 2 are formed in the sheet 11 thereby forming a blister sheet 11A in which the blisters 80 are preformed.

The blister sheet 11A then reaches a longitudinal direction half-cutting part 17 wherein a half-cutting is carried out to form half-cut lines 18 shown in FIG. 2 in a lower surface of the blister sheet 11A along the longitudinal direction of the blister sheet 11A (that is, a sheet feeding direction). A half-cut sheet 11B is formed by forming the half-cut lines 18 in the blister sheet 11A along the longitudinal direction thereof.

Next, an automatic material supplying part 21 comprising a hopper 19 and a supply roller 20 supplies materials such as candies 22, for example, into the blisters 80 as shown in FIG. 2.

Figure 14:
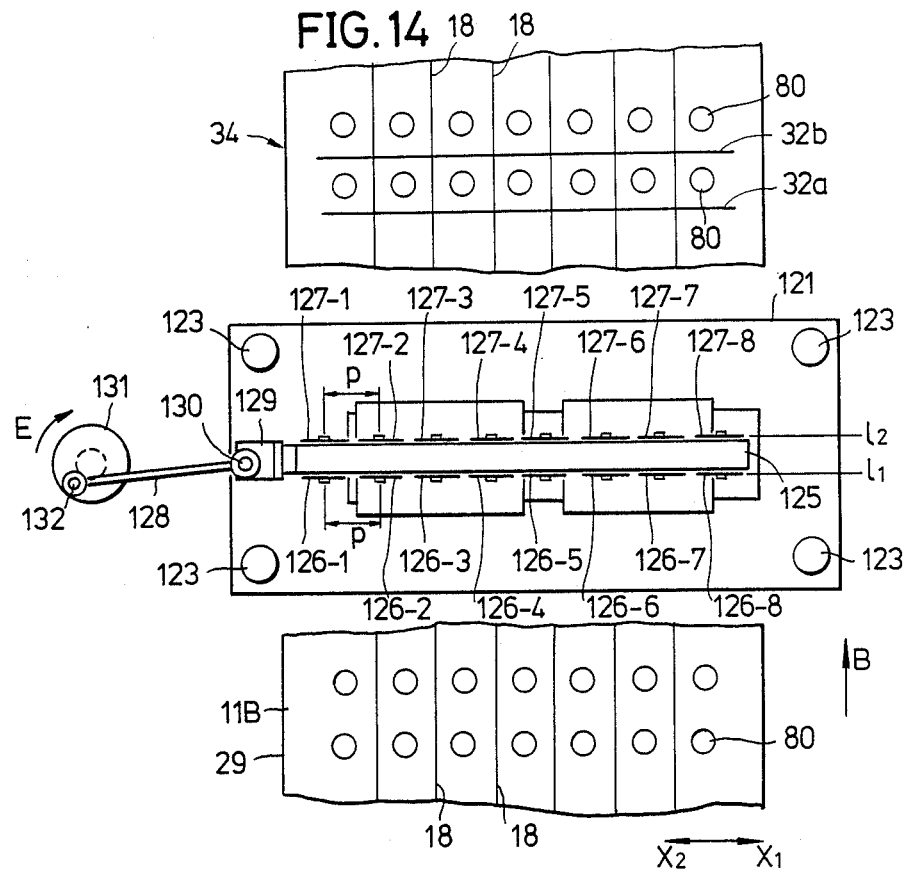
FIG. 14 is a plan view of the mechanism shown in FIG. 13 with a top plate portion thereof omitted.

A metal foil member adhering part 23 thermally adheres as the metal foil an aluminum foil 27 which is drawn out of a roll 26 on an upper surface of the half-cut sheet 11B by use of a pair of sealing rolls 24 and 25. As a result, openings 28 of the blisters 80 shown in FIG. 2 are covered by the aluminum foil 27, and a band blister package 29 shown in FIG. 14 is obtained.

The band blister package 29 is guided by a tension roller 30 and reaches a width direction half-cutting part 31 wherein a half-cutting is carried out to form half-cut lines 32a and 32b shown in FIG. 2 in a lower surface of the half-cut sheet 11B along the width direction of the half-cut sheet 11B (that is, a direction perpendicular to the sheet feeding direction). Therefore, the band blister package 29 is latticed by the half-cut lines 18, 32a and 32b as shown in FIG. 2, and a half-cut band blister package 34 in which each blister package portion 33 is sectioned by the half-cut lines 18, 32a and 32b is obtained.

The half-cut band blister package 34 is passed through a curl reforming part 35 wherein the curl is reformed, and is punched out by a punch mechanism 36. As a result, a blister package 37 shown in FIG. 2 is conveyed by a conveyor 38. The remains of the half-cut band blister package 34 after the punching are taken up on a reel 39.

In FIG. 1, an arrow B indicates a feeding direction of the sheets 11, 11A and 11B.

Next, a description will be given on each part of the blister packaging apparatus 10 by referring to FIG. 3 and the following drawings. In these drawings, those parts which are the same as those corresponding parts in FIGS. 1 and 2 are designated by the same reference numerals.

First, a description will be given on the blister forming part 13 by referring to FIGS. 3 through 9. As shown in FIG. 3, the drum 14 comprises an aluminum main drum body 51 and a plurality of concave pockets 53 arranged on a peripheral surface of the main drum body 51 in alignment along the circumferential and axial directions of the main drum body 51.

Figure 4:
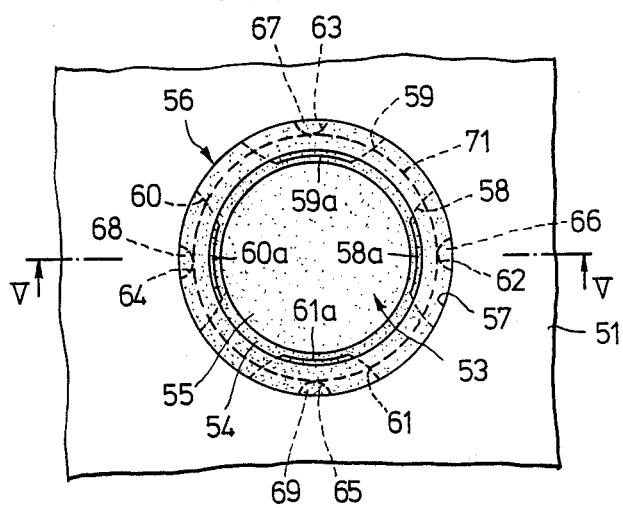
FIG. 4 is a plan view on an enlarged scale showing a concave pocket of the blister forming drum shown in FIG. 3.
Figure 5:
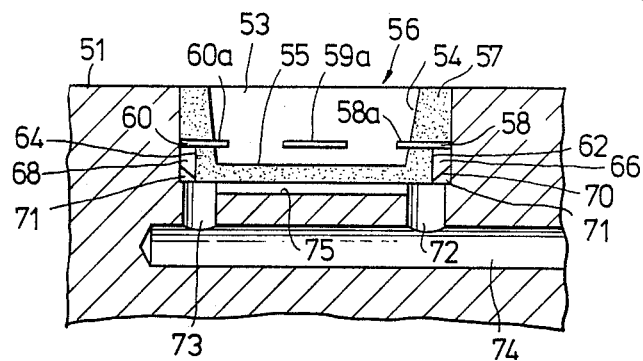
FIG. 5 is a cross sectional view of the concave pocket along a line V—V in FIG. 4.
Figure 9:
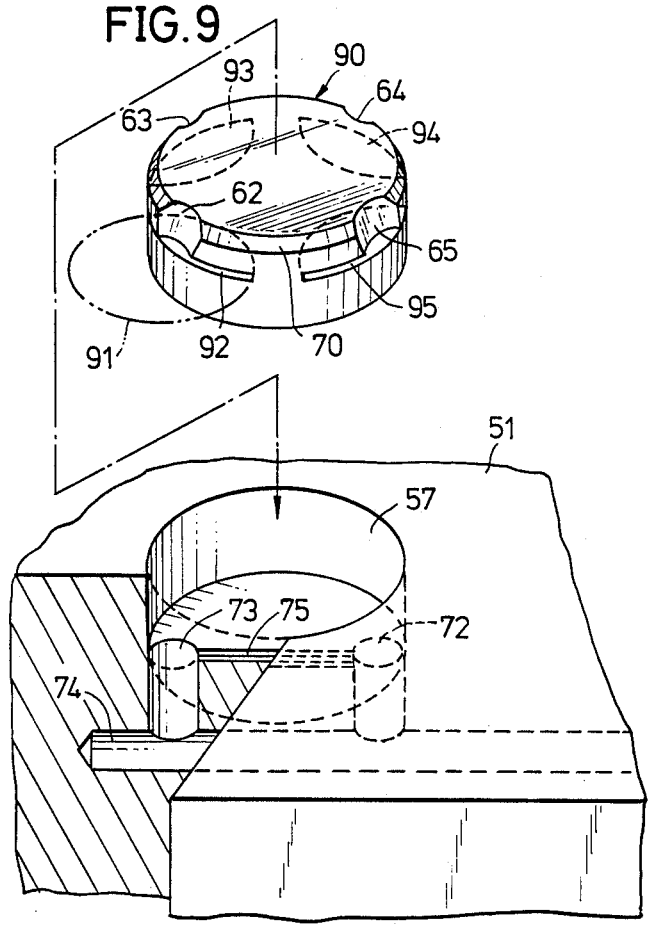
FIG. 9 is a diagram for explaining the formation of the concave pocket shown in FIGS. 4 and 5.
Figure 12:
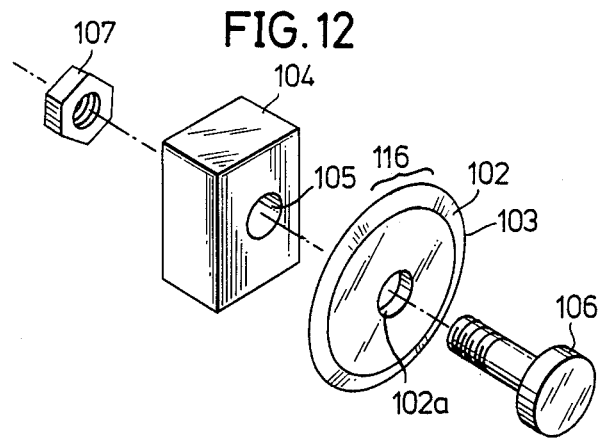
FIG. 12 is a disassembled perspective view showing a mounting structure for a circular blade.

FIGS. 4 and 5 show the structure of one concave pocket 53 shown in FIG. 3 on an enlarged scale. The concave pocket 53 comprises a peripheral wall 54 and a bottom surface 55. The concave pocket 53 is formed in a concave pocket body 56 which is made of a material having a small thermal conductance such as a polyimide resin and fluoroplastics, and this concave pocket body 56 is fixed within a hole 57 shown in FIG. 6 formed in the peripheral surface of the main drum body 51 as shown in FIG. 9. The material used for the concave pocket body 56 is not limited to a specific material, but it is desirable that at least the peripheral wall 54 is made of a material having a small thermal conductance so as to minimize a difference in the blister thicknesses at various portions of the blister 80.

Suction holes 58, 59, 60 and 61 are formed in the concave pocket body 56. The suction holes 58, 59, 60 and 61 open to the peripheral wall 54 of the concave pocket 53 as slit holes 58a, 59a, 60a and 61a. The slit holes 58a through 61a are arranged at equiangular intervals along the circumferential direction of the concave pocket 53 at height positions slightly closer to the bottom surface 55 than a center height position within the concave pocket 53. There are no suction holes other than the suction holes 58 through 61, and no suction hole opens to the bottom surface 55 of the concave pocket 53.

The suction holes 58 through 61 communicates to a ring-shaped hole 71 which is formed by a planed-off portion 70 of the concave pocket body 56 and an edge portion of the hole 57, through vertical holes 66 through 69 which are formed by a peripheral wall of the hole 57 and depressions 62 through 65 shown in FIG. 9 in the peripheral surface of the concave pocket body 56.

Figure 6:
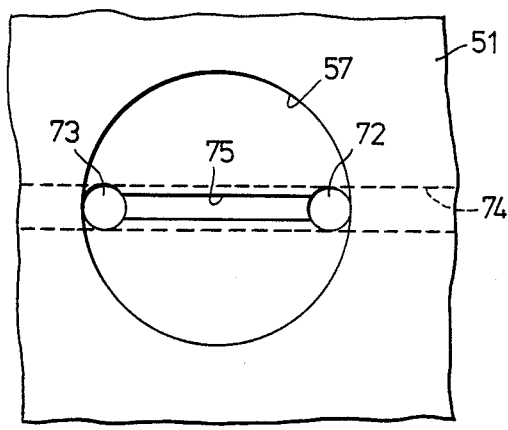
FIG. 6 is a plan view showing a hole in a main drum body of the blister forming drum shown in FIG. 3.

As shown in FIGS. 5, 6 and 9, vertical holes 72 and 73 are formed in the main drum body 51 at diametrically opposite sides on the bottom surface of the hole 57. Upper ends of the vertical holes 72 and 73 communicate to the ring-shaped hole 71, while lower ends of the vertical holes 72 and 73 communicate to a horizontal hole 74 formed along the axial direction of the main drum body 51 as shown in FIG. 3. In addition, the upper ends of the vertical holes 72 and 73 communicate to each other through a groove 75 formed in the bottom surface of the hole 57.

Accordingly, the concave pockets 53 communicate to a suction pump (not shown) through the suction holes 58a through 61a, the vertical holes 72 and 73 and the horizontal holes 74.

Furthermore, as shown in FIG. 3, small circular suction holes 76 and slit suction holes 77 are formed in the peripheral surface of the main drum body 51. The suction holes 76 and 77 communicate to suction holes 78.

Figure 7:
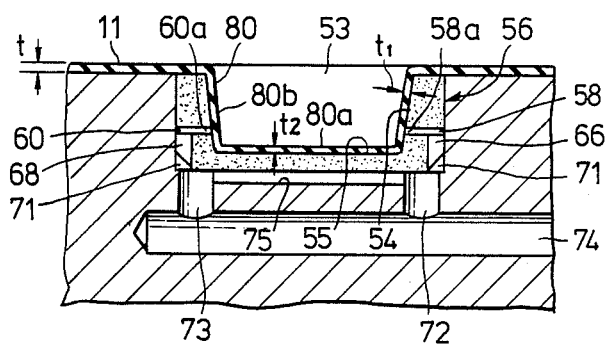
FIG. 7 is a cross sectional view showing a state where a blister is formed.

When forming the blisters 80 by use of the blister forming drum 14, the air inside the concave pocket 53 is sucked out through the suction holes 58 through 61, and the sheet 11 is drawn into (or pushed into) the concave pocket 53 as shown in FIG. 7 due to a pressure difference between the pressure inside the concave pocket 53 and the external pressure. The sheet 11 drawn into the concave pocket 53 adheres closely to the peripheral wall 54 and the bottom surface 55 of the concave pocket 53, and the blister 80 shown in FIG. 8 is formed.

Because the inner surface of the concave pocket 53 is made of the polyimide resin, heat is not absorbed when the sheet 11 heated by the heater 15 adheres closely to the inner surface of the concave pocket 53. For this reason, the sheet 11 is maintained in the heated state and undergoes a uniform expansion in its entirety. Hence, the blister 80 is formed so that not only a thickness $t_1$ of a peripheral wall portion 80b of the blister 80 but also a thickness $t_2$ of a top portion 80a of the blister 80 is not particularly reduced compared to a thickness t of the sheet 11. In other words, ratios $t_1/t$ and $t_2/t$ are both large and close to 1.0. This is achieved by the material used for the concave pocket 53 and providing the slit holes 58a through 61a only in the peripheral wall 54 instead of at the bottom of the concave pocket 53 as is the case of the conventional apparatus.

Since there is no suction hole in the bottom surface 55 of the concave pocket 53, the top portion 80a of the blister 80 can be formed to a relatively large thickness, and no conical projection is formed on the top portion 80a. Accordingly, the strength and rigidity of the blister package 37 are high, and there is no possibility of the aluminum foil covering the bottom of the blister 80 being damaged when the blister packages 37 are stacked.

Figure 8:
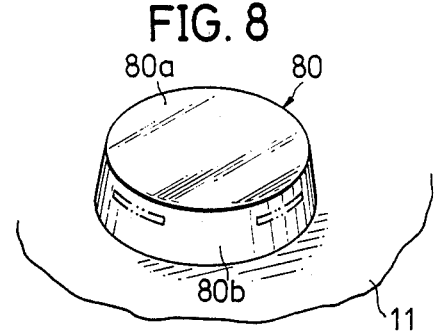
FIG. 8 is a perspective view showing a blister formed by the blister forming drum shown in FIG. 3.

Portions of the peripheral wall portion 80b of the blister 80 indicated by two-dot chain lines in FIG. 8 confront the slit holes 58a through 61a. Because the thickness $t_1$ of the peripheral wall portion 80b shown in FIG. 7 is relatively large and due to the shape of the slit holes 58a through 61a, no conical projection is formed on the peripheral wall portion 80b. As a result, no trace of the suction holes exist in the top portion 80a and the peripheral wall portion 80b, and the external appearance of the blister 80 is extremely satisfactory. The strength, rigidity and gas penetration preventing characteristic are improved, and the thickness of the raw sheet may be reduced in some cases to contribute to the cutting down on the exploitation of natural resources.

In FIG. 1, the sheet 11 is in close adherence with the peripheral surface 51a of the main drum body 51 which is liquid-cooled, under the suction through the suction holes 76 and 77, during an interval confronting the heater 15. For this reason, the heat at portions of the sheet 11 not confronting the concave pockets 56 is absorbed by the main drum body 51 and the sheet 11 is not heated at these portions. The sheet 11 is uniformly fixed on the peripheral surface 51a of the main drum body 51 under the suction, and no undulations or wrinkles occur on the sheet 11. Accordingly, the sheet 11 is heated only at the portions confronting the concave pockets 53, and the blisters 80 are formed uniformly without being affected by non-blister portions of the sheet 11. Furthermore, since the non-blister portions of the sheet 11 are also uniform, the thermal adherence of the metal foil member on the bottom of the blister package 37 is satisfactory, and the product value of the blister package 37 is superior from the point of view of external appearance and sealing characteristic. The present embodiment is suited for the case where a transparent polypropylene sheet showing essentially no expansion and having a non-transparency factor of 5% or less is used for the sheet 11, and especially when the polypropylene sheet is thin in the order of 300 μm or less.

The concave pocket 53 having the slit holes 58a through 61a only on the peripheral wall 54 thereof is formed as follows. As shown in FIG. 9, a flat cylinder shaped piece 90 has the planed-off portion 70 on the periphery of the upper surface thereof. Cuts 92 through 95 having a predetermined depth are formed horizontally in the piece 90 by a metal saw 91 from four sides, and the depressions 62 through 65 are formed between the upper surface of the piece 90 and the corresponding cuts 92 through 95. The piece 90 is fitted into the hole 57 of the main drum body 51 with the side of the planed-off portion 70 facing down, and the concave pocket 53 is formed in the piece 90 (that is, drilled, for example) from the peripheral surface of the main drum body 51 so as to expose the cuts 92 through 95 within the concave pocket 53.

The shape of the suction holes within the concave pocket 53 is not limited to that of the slit holes 58a through 61a, and may be circular, for example. However, it is desirable that the suction holes have such a shape that the suction force is dispersed as in the case of the slit holes 58a through 61a. In addition, even in the case of the slit holes 58a through 61a, the slit holes 58a through 61a need not necessarily be arranged horizontally, and the slit holes 58a through 61a may be arranged vertically or obliquely. The height position of the slit holes 58a through 61a may be closer to the opening 28 of the blister 80. Especially when the connecting portion between peripheral wall 54 and the bottom surface 55 of the concave pocket 53 has a large radius of curvature, it is desirable that the slit holes 58a through 61a are provided at positions avoiding the connecting portion because the edge portions of the slit holes 58a through 61a are easily damaged if formed at the curved connecting portion.

Next, a description will be given on the longitudinal direction half-cutting part 17 by referring to FIGS. 10 through 13. FIGS. 10 and 11 show a longitudinal direction half-cut line forming mechanism 100 which constitutes the longitudinal direction half-cutting part 17 shown in FIG. 1.

Figure 13:
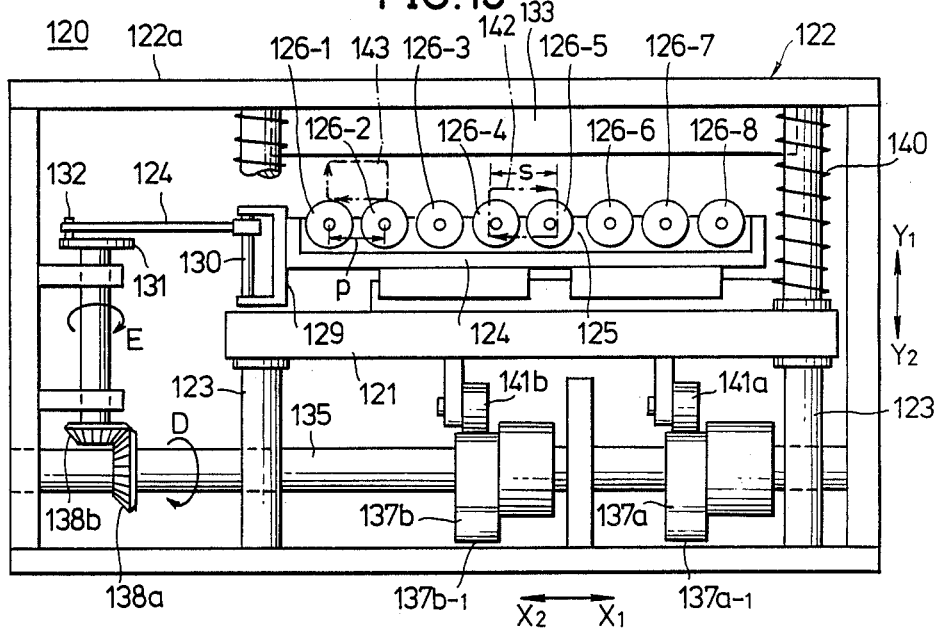
FIG. 13 shows a width direction half-cut line forming mechanism viewed from the sheet feeding direction.

A plurality of blade supports 104 are mounted on a base 101 at equal intervals by screws 117. Each blade support 104 has a circular blade 102 fixed thereon, where the circular blade 102 has a diameter of 30 mm. As shown in FIG. 13, a blade 103 is formed on the entire circumference of the circular blade 102. A bolt 106 penetrates a center hole 102a of the circular blade 102 and a hole 105 in the blade support 104, and the circular blade 102 is fixed to the side surface of the blade support 104 by a nut 107 which is screwed onto the end of the bolt 106.

A roll 108 is rotatably provided on a lower side of a support base 109. Both ends of the support base 109 are supported by guide beams 110 and 111, respectively, so that the support base 109 is movable upwardly and downwardly. The support base 109 is urged upwardly by springs 112 and 113, and a height position thereof is restricted by cams 115a and 115b which are rotated by a knob 114 and stop the upper surface of the support base 109. The roll 108 moves downwardly from a position indicated by a two-dot chain line in FIG. 11 to approach the circular blade 102, and is restricted to a height position separated by a predetermined distance g from the top of the circular blade 102. This predetermined distance g determines the depth of the half-cut into the sheet 11A.

As shown in FIGS. 10 and 11, the upper surface of the sheet 11A is pushed by the roll 108, and moves in the direction B between the roll 108 and the circular blade 102 while rotating the roll 108 in a direction C. The circular blade 102 does not rotate nor move. When the sheet 11A passes between the roll 108 and the circular blade 102, the longitudinal direction half-cut line 18 having a predetermined depth $d_1$ is formed in the lower surface of the sheet 11A by the circular blade 102.

A blade portion 116 of the blade 103 which is carrying out the half-cut, that is, the top portion of the blade 103, has an arcuate shape in FIG. 11 when viewed from a direction perpendicular to the moving direction of the sheet 11A. For this reason, the half-cut line 18 is not formed to the predetermined depth $d_1$ abruptly, but is formed gradually into the surface of the sheet 11A. Accordingly, no abrupt force acts on the circular blade 102 when carrying out the half-cut, and the external force acting on the circular blade 102 is reduced. Moreover, the circular blade 102 is circular, rigid and uneasily bent because portions of the circular blade 102 other than the circumferential portion thereof is relatively thick. Further, the circular blade 102 is fixed at the center hole 102a thereof, and the circular blade 102 is mounted with a sufficient rigidity.

Therefore, when carrying out the half-cut, the circular blade 102 does not vibrate, and the half-cut line 18 can be formed with a satisfactory accuracy. In addition, when the blade portion 116 wears out due to friction and becomes dull, the nut 107 is loosened and the circular blade 102 is rotated by a predetermined angle so that an unused blade portion becomes the top portion and the worn out blade portion 116 recedes from the top portion. The nut 107 is then tightened to fix the circular blade 102 in this new rotary position, and the sharpness of the circular blade 102 is restored.

By successively changing the rotary position of the circular blade 102 every time a blade portion becomes dull, it is possible to effectively utilize the entire blade 103. Hence, it is possible to use the same circular blade 102 for a long time period of several years, for example, and it is thus possible to reduce the maintenance cost of the longitudinal direction half-cutting part 17.

On the other hand, since the circular blade 102 is circular and is axially supported at the center hole 102a thereof, the operation of moving the unused blade portion of the blade 103 to the top portion and making the worn out blade portion 116 recede from the top portion can be carried out easily by simply loosening the nut 107 and slightly rotating the circular blade 102 about the bolt 106 by a predetermined angle. Furthermore, the accuracy of the half-cut is unaffected by the slight rotation of the circular blade 102 and remains the same. Hence, it is unnecessary to carry out a readjustment of the depth of the half-cut, and the operation of restoring the sharpness of the circular blade 102 is simple also from this point of view.

The circular blade 102 can be manufactured with a high precision because of its circular shape. Thus, the positioning accuracy of the circular blade 102 is extremely satisfactory because the circular blade 102 can be mounted with a high accuracy by the axial support at the center hole 102a and also because the circular blade 12 is manufactured with the high precision. A minute adjustment to finely adjust the predetermined depth $d_1$ is carried out by rotating an adjusting screw 118 so as to raise the blade support 104.

Although the circular blade 102 is circular, the circular blade 102 is used in a stationary state where the circular blade 102 does not rotate. For this reason, there is no need to provide a mechanism for rotating the circular blade 102, such as a motor and a bearing. Accordingly, the construction of the longitudinal direction half-cutting part 17 is simple, and the overall size of the blister packaging apparatus can be effectively reduced. Moreover, since the circular blade 102 does not rotate, it is possible to use the same circular blade 102 even when a portion of the blade 103 breaks, by simply changing the rotary position of the circular blade 102 so that a sharp blade portion becomes the top portion of the circular blade 102.

Figure 15:
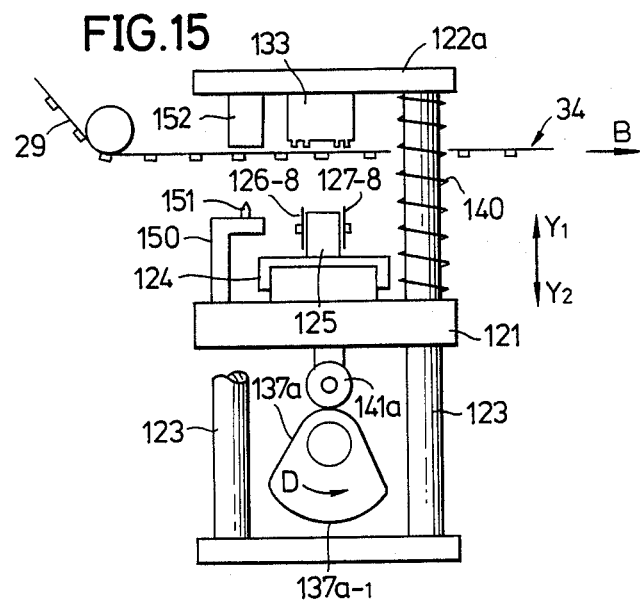
FIG. 15 is a side view of the mechanism shown in FIG. 13.

Next, a description will be given on the width direction half-cutting part 31 by referring to FIGS. 13 through 21. FIGS. 13 through 15 show a width direction half-cut line forming mechanism 120 which constitutes the width direction half-cutting part 31 shown in FIG. 1.

In FIGS. 13 through 15, four corners of a base 121 are guided by guide beams 123 fixed on a frame 122, and the base 121 is movable in directions $Y_1$ and $Y_2$. A movable base 124 provided on the base 121 is movable in directions $X_1$ and $X_2$. A blade support 125 having an elongated block shape is mounted on the movable base 124. Eight circular blades 126-1 through 126-8 having the same construction as the circular blades 102 described before are fixed on one side of the blade support 125 by screws which penetrate center holes of the circular blades 126-1 through 126-8. Similarly, eight circular blades 127-1 through 127-8 having the same construction as the circular blades 102 described before are fixed on the other side of the blade support 125 by screws which penetrate center holes of the circular blades 127-1 through 127-8.

The top portions of the circular blades 126-1 through 126-8 are aligned along the moving direction of the blade support 125, that is, the circular blades 126-1 through 126-8 are aligned at equal intervals (pitch) p on a line $l_1$ which coincides with the moving direction of the blade support 125. The top portions of the circular blades 127-1 through 127-8 are also aligned along the moving direction of the blade support 125, that is, the circular blades 127-1 through 127-8 are aligned at equal intervals p on a line $l_2$ which coincides with the moving direction of the blade support 125. The top portions of the circular blades 126-1 through 126-8 and 127-1 through 127-8 are set to the same height position along the directions $Y_1$ and $Y_2$.

One end of a connecting rod 128 is connected to a pole 130 on an approximately U-shaped bracket 129 which is fixed on the movable base 124, while the other end of the connecting rod 128 is connected to a pin 132 located at an eccentric position on a disc 131. A back plate 133 is fixed on the lower surface of a top plate 122a of the frame 122 so as to confront the blade support 125. As will be described later, the sheet 11B is pushed against the back plate 133.

When a shaft 135 is rotated in a direction D by a motor (not shown), a pair of cams 137a and 137b rotate in the direction D, and the disc 131 is rotated in a direction E through bevel gears 138a and 138b. The cams 137a and 137b and the disc 131 are rotated in synchronism with each other at the same rotational speed.

Due to the rotation of the cams 137a and 137b, the blade support 125 moves in the directions $Y_1$ and $Y_2$ while being pushed by a spring 140, and the blade support 125 is moved in the directions $X_1$ and $X_2$ by the rotation of the disc 131 through the connecting rod 128. The rotary positions of the cams 137a and 137b and the disc 131 are set so that the blade support 125 moves in the directions $X_1$ and $X_2$ during an interval in which arcuate portions 137a-1 and 137b-2 of the cams 137a and 137b are in contact with cam followers 141a and 141b and the blade support 125 moves in the directions $Y_1$ and $Y_2$ during an interval in which the moving quantity of the pin 132 on the disc 131 in the directions $X_1$ and $X_2$ is small. Accordingly, the blade support 125 undergoes a box motion indicated by a locus 142, and the top portion of the circular blade 126-1 undergoes a box motion indicated by a locus 143. The top portions of the other circular blades 126-2 through 126-8 and 127-1 through 127-8 undergo similar box motions.

The location of the pin 132 on the disc 131 is set appropriately so that a stroke S of the blade support 125 in the directions $X_1$ and $X_2$ is slightly longer than the interval (pitch) p of the circular blades 126-1 through 126-8. Accordingly, the moving ranges of two mutually adjacent circular blades in the directions $X_1$ and $X_2$ partially overlap.

The circular blades 126-1 through 126-8 form half-cut line portions 162 in the sheet 11B which constitutes the band blister package 29 and is pushed against the back plate 133, during a stage where the circular blades 126-1 through 126-8 move in the direction $X_1$ in a vicinity of the back plate 133. As a result, the half-cut line portions 162 shown in FIG. 17 which connect to form the continuous linear half-cut line 32a are formed for the entire width of the sheet 11B.

Figure 17:
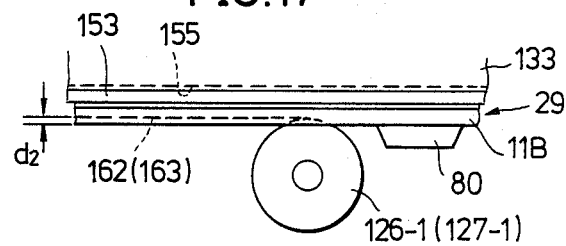

The circular blades 127-1 through 127-8 similarly form half-cut line portions 163 shown in FIG. 17 in the sheet 11B. Hence, the half-cut line portions 163 which connect to form the continuous linear half-cut line 32b are formed for the entire width of the sheet 11B.

The stroke S of the blade support 125 in the directions $X_1$ and $X_2$ is short, and the box motion of the blade support 125 is completed within a short time. For this reason, the half-cut lines 32a and 32b can be formed simultaneously within a short time. The performance of the width direction half-cut line forming mechanism 120 is thus sufficient to cope with the speeding up of the product packaging.

Next, a description will be given on the formation of the half-cut lines 32a and 32b by referring to FIGS. 16 through 19. The band blister package 29 is fed intermittently in the direction B between the blade support 125 and the back plate 133. The half-cut lines 32a and 32b are formed while the band blister package 29 is stationary, in a state shown in FIG. 15 where a plurality of pins 151 projecting from a push base 150 on the base 121 push the band blister package 29 against a base 152 which is fixed on the top plate 122a and the band blister package 29 is clamped so as not to slip out of position.

Figure 16:
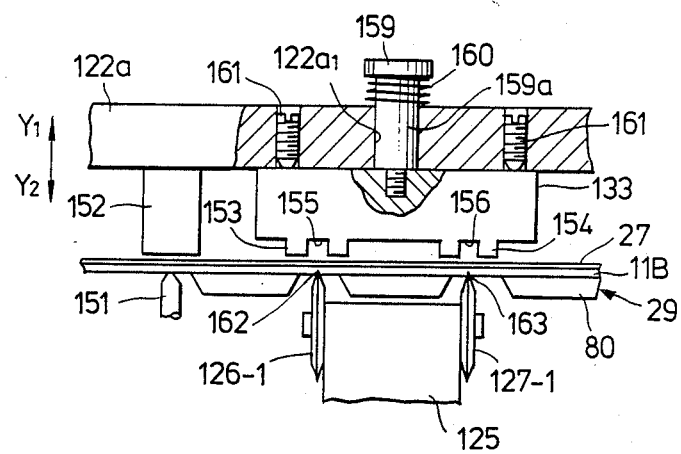
FIGS. 16 through 19 are diagrams for explaining the formation of half-cut line portions.

Rails 153 are formed on the back plate 133 in correspondence with the circular blades 126-1 through 126-8, and rails 154 are formed on the back plate 133 in correspondence with the circular blades 127-1 through 127-8. A groove 155 is formed between the rails 153 so as to confront the top portions of the circular blades 126-1 through 126-8, and a groove 156 is formed between the rails 154 so as to confront the top portions of the circular blades 127-1 through 127-8. As shown in FIGS. 16 and 17, the top portion of the circular blade 126-1 (or 127-1) moves while cutting into a portion of the sheet 11B confronting the groove 155 (or 156) to form the half-cut line 32a (or 32b). In other words, contrary to the case shown in FIG. 11, the half-cut lines 32a and 32b are formed in the band blister package 29 (sheet 11B) which is stationary by moving the circular blades 126-1, 127-1 and the like which are in the non-rotational state.

By using the circular blades 126-1, 127-1 and the like, it is possible to obtain effects similar to those already described before in conjunction with FIGS. 10 through 12. Especially because the circular blades do not vibrate, no cutting error is introduced at the overlapping portion of the adjacent half-cut line portions when the half-cut is carried out in the box motion, and the half-cut can be carried out at a high speed. A detailed description of such advantageous effects obtainable by the use of the circular blades will be omitted since a description thereof is already given before.

The back plate 133 is mounted on the top plate 122a of the frame 122 as shown in FIG. 16. A threaded portion 159a of a screw 159 is screwed into a hole 122a. in the top plate 122a. A spring washer 160 is provided between the head of the screw 159 and the top plate 122a. The position of the back plate 133 is adjusted in the direction $Y_1$ or $Y_2$ by appropriately tightening or loosening a plurality of adjusting screws 161. A depth $d_2$ of the half-cut lines 32a and 32b is adjusted by adjusting the position of the back plate 133. Accordingly, it is possible to form half-cut line portions 162 and 163 (half-cut lines 32a and 32b) having the depth $d_2$ thereof accurately set, by appropriately adjusting the position of the back plate 133.

Figure 18:
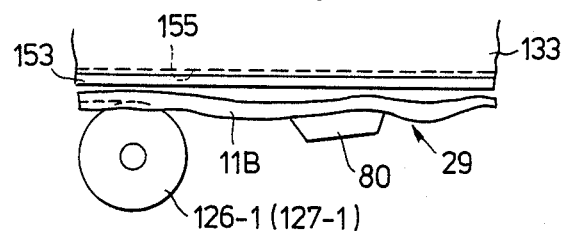

The rails 153 and 154 have the function of limiting the regions in which the band blister package 29 is pushed against the back plate 133 to the portions confronting the circular blades. In other words, the rails 153 and 154 have the function of raising from the back plate 133 the portions of the band blister package 29 not confronting the circular blades. As a result, even when the band blister package 29 has undulations as shown in FIG. 18, it is possible to minimize the effects of the undulations on the half-cutting.

Figure 19:
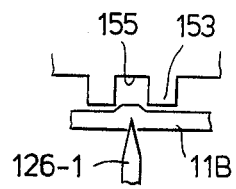

As shown in FIG. 19, the groove 155 also has the function of letting go the sheet 11B which is pushed by the circular blade 126-1. The groove 156 similarly has the function of letting go the sheet 11B which is pushed by the circular blade 127-1. Accordingly, even when the band blister package 29 is not completely flat and has the undulations, it is possible to form the half-cut line portions 162 and 163 approximately to the uniform depth $d_2$ by the functions of the rails 153 and 154 and the grooves 155 and 156.

Figure 20:
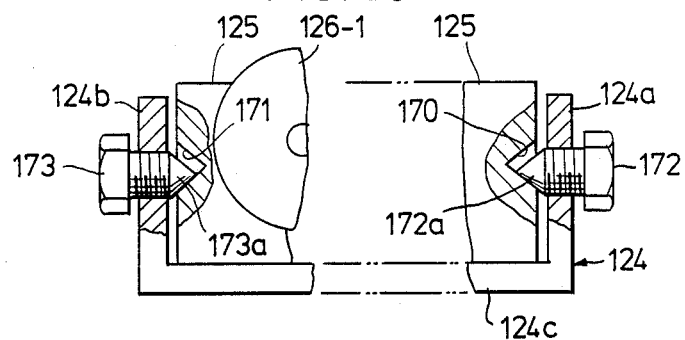
FIGS. 20 and 21 are a front view and a side view respectively showing a mounting structure for a blade base to a movable base.

Next, a description will be given on a mounting structure for the blade support 125 by referring to FIGS. 20 and 21. Tapered holes 170 and 171 are formed on both end surfaces of the blade support 125. Screws 172 and 173 having tapered portions 172a and 173a at tip ends thereof are provided on respective flanges 124a and 124b on both ends of the movable base 124. The location of the screws 172 and 173 are eccentric with respect to the tapered holes 170 and 171. The movable base 124 comprises a bottom plate 124c and a side plate 124d for positioning the blade support 125.

Figure 21:
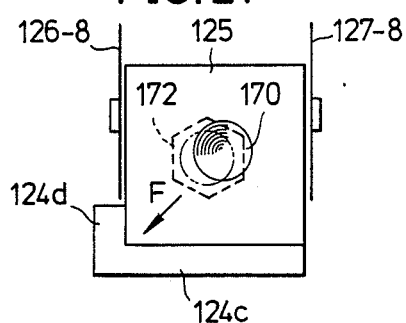

The blade support 125 is pushed by the tapered portions 172a and 173a at the tapered holes 170 and 171 and is urged in a direction F in FIG. 21. Hence, the blade support 125 is mounted in a state where the blade support 125 is pushed against the bottom plate 124c and the side plate 124d and accurately positioned.

When adjusting the circular blades 126-1 through 127-8, the blade support 125 can be removed with ease by loosening the screws 172 and 173. When mounting the blade support 125 again, the screws 172 and 173 simply need to be tightened. The blade support 125 is positioned with a high accuracy, and there is no need to make positional adjustments.

Figure 22:
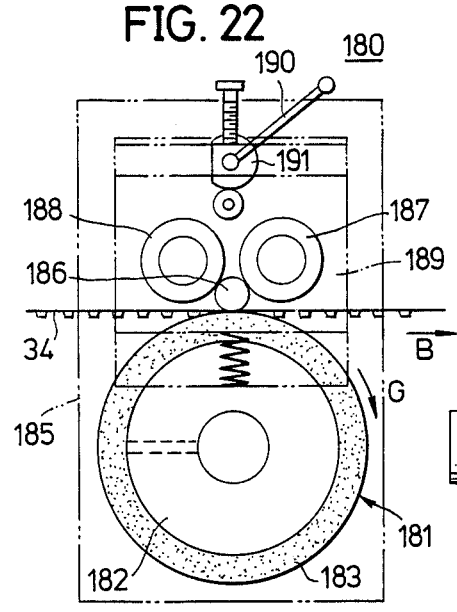
FIGS. 22 and 23 are a front view and a side view respectively showing a curl reforming mechanism.
Figure 23:
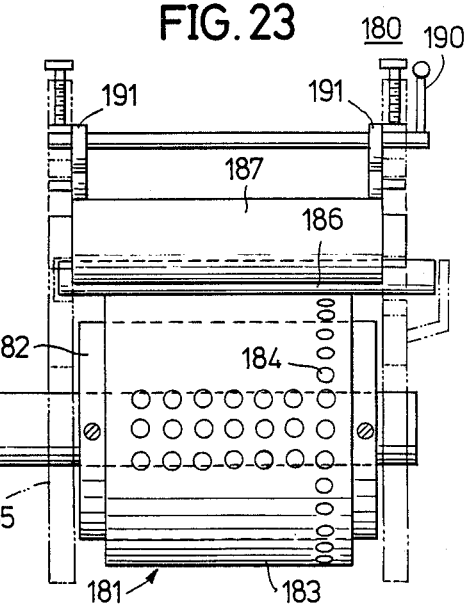

Next, a description will be given on the curl reforming part 35 by referring to FIGS. 22 and 23. FIGS. 22 and 23 show a curl reforming mechanism 180 which constitutes the curl reforming part 35 shown in FIG. 1. A drum 181 comprises a main drum body 182 and a cylinder 183. The cylinder 183 is a resilient body surrounding the main drum body 182 and is made of polyurethane rubber, for example. Cavities 184 into which the blisters 80 enter are formed on the peripheral surface of the cylinder 183. The drum 181 is supported on a frame 185 and rotates intermittently in a direction G.

Both ends of large diameter support rolls 187 and 188 are supported by a support block 189 and limit the bending of a small diameter roll 186. The support block 189 is pushed downwardly by a cam 191 which is rotated by a lever 190, and the half-cut band blister package 34 is pinched between the drum 181 and the small diameter roll 186. The half-cut band blister package 34 is fed intermittently in the direction B according to the rotation of the drum 181.

The small diameter roll 186 partially intrudes the surface of the cylinder 183. For this reason, the half-cut band blister package 34 is forcibly bent by the small diameter roll 186 so as to curve down, and the curl in the half-cut band blister package 34 is reformed.

Next, a description will be given with respect to modifications of the present embodiment of the blister packaging apparatus according to the present invention by referring to FIGS. 24 through 26.

In the blister forming part 13 shown in FIG. 1, it is possible to employ in addition to the indirect heating system using the heater 15 a preliminary heating part such as a heating roll or an indirect heater.

Figure 24:
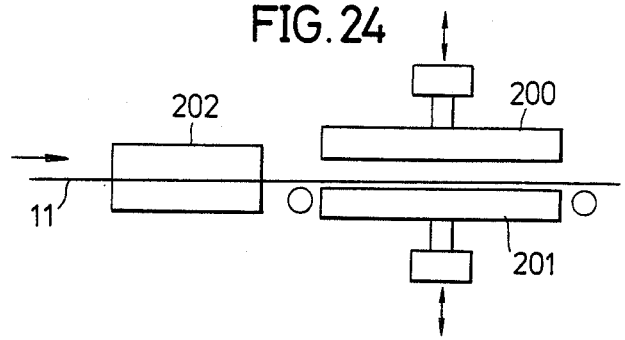
FIG. 24 shows a modification of a blister forming part.

Instead of the blister forming mechanism using the drum 14, it is possible to employ a blister forming mechanism using die plates 200 and 201 shown in FIG. 24. The mechanism shown in FIG. 24 also comprises a preliminary heating part 202. The preliminary heating part 202 may be omitted in a case where the die plates 202 and 201 themselves are designed to be heated.

The sheet which is to be formed with the blisters is not limited to the polypropylene sheet 11, and the sheet may be made of other materials such as polyethylene, polystyrene and polyvinyl chloride (PVC). Furthermore, the sheet is not limited to a single layer sheet, and the sheet may have a multi-layer construction. For example, the sheet having the multi-layer construction may include layers made of different materials such as polypropylene and resins which can effectively prevent penetration of gas such as saponificated ethylene-vinyl acetate copolymer, polyvinylidene chloride, polyester and nylon.

The automatic material supplying part 21 may supply materials other than candies, such as tablets, capsules and injection needles. It is also possible to supply foods which are liquidized when heated such as jelly. Furthermore, the surface of the metal foil may be treated or a resin having a satisfactory adhesion characteristic may be laminated on the metal foil so as to improve the adherence of the metal foil on the blister package.

Figure 25:
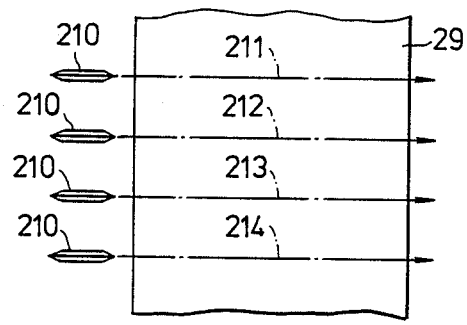
FIGS. 25 and 26 show modifications of a width direction half-cut line forming part.
Figure 26:
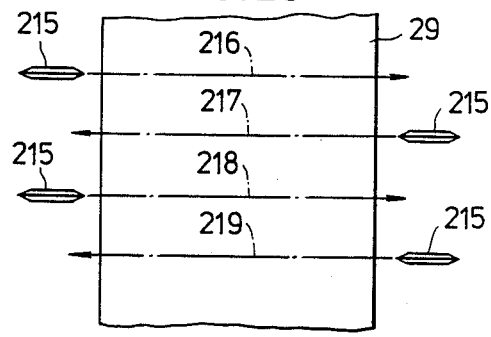

The width direction half-cutting part 31 may be constructed as shown in FIGS. 25 or 26.

In FIG. 25, a plurality of circular blades 210 having the same construction as the circular blades 102 are arranged on one side of the band blister package 29 along the feeding direction of the band blister package 29. The circular blades 210 are fixed in the non-rotational state and are moved in the same direction along respective loci 211 through 214 throughout the entire width of the band blister package 29, so as to form the half-cut lines.

In FIG. 26, a plurality of circular blades 215 having the same construction as the circular blades 102 are alternately arranged on both sides of the band blister package 29. The circular blades 215 on both sides of the band blister package 29 are fixed in the non-rotational state and are moved in mutually opposite directions along respective loci 216 through 219 throughout the entire width of the band blister package 29, so as to form the half-cut lines.

The diameter of the circular blades 102, 126-1 through 126-8, 127-1 through 127-8, 210 and 215 is not limited to 30 mm, and may have other diameters. Normally, the diameter of these circular blades is in a range of 20 mm to 50 mm.

The locations of the half-cutting parts 17 and 31 are not limited to those shown in FIG. 1, and it is of course possible to provide the half-cutting parts 17 and 31 at other locations.

Further, the present invention is not limited to these embodiments, but various variations and modifications may be made without departing from the scope of the present invention.

What is claimed is:
1. A blister packaging apparatus comprising:
 a blister forming part for forming a plurality of blisters in a thermoplastic resin sheet;

an automatic material supplying part for automatically supplying materials into the blisters of the thermoplastic resin sheet;

a metal foil member adhering part for adhering a metal foil member to the thermoplastic resin sheet so as to cover openings of the blisters accommodating the materials;

a half-cutting part comprising at least one circular blade which is fixed in a non-rotational state and has a blade formed on an entire circumference thereof for forming a half-cut line in the thermoplastic resin sheet for facilitating separation of the blisters; and a curl reforming part for reforming a curl in the thermoplastic resin sheet on which the metal foil member is adhered.

2. A blister packaging apparatus as claimed in claim 1 in which said circular blade of said half-cutting part has a center hole thereof axially supported in the non-rotational state, said half-cutting part moving at least one of said circular blade and said thermoplastic resin sheet so that out of blade portions constituting the blade of the circular blade a blade portion making contact with the thermoplastic resin sheet forms the half-cut line.

3. A blister packaging apparatus as claimed in claim 1 in which said half cutting part comprises a blade base having a plurality of circular blades axially supported thereon by center holes of the circular blades in the non-rotational state, said circular blades being arranged so that surfaces of the circular blades lie on a single plane, and a mechanism for moving said blade base toward and away from the thermoplastic resin sheet and for moving said blade base parallel to said single plane a distance substantially corresponding to a separation between two mutually adjacent circular blades, said circular blades respectively forming half-cut line portions which connect to form the half-cut line.

4. A blister packaging apparatus as claimed in claim 1 in which said blister forming part comprises a blister forming drum having a plurality of concave pockets in a peripheral surface thereof, each of said concave pockets having one or a plurality of suction holes in a peripheral wall thereof for drawing the thermoplastic resin sheet into said concave pocket under suction so as to form the blister.

5. A blister packaging apparatus as claimed in claim 1 in which said thermoplastic resin sheet is a continuous sheet drawn out of a roll, said half-cutting part comprising a longitudinal direction half-cutting part for forming a half-cut line in a longitudinal direction of the continuous sheet and a width direction half-cutting part for forming a half-cut line in a width direction of the continuous sheet, said longitudinal direction half-cutting part comprising at least one circular blade having a center hole thereof axially supported in the non-rotational state and moving at least one of said circular blade and the continuous sheet so that out of blade portions constituting the blade of the circular blade a blade portion making contact with the continuous sheet forms the half-cut line in the longitudinal direction, said width direction half-cutting part comprising a blade base having a plurality of circular blades which are axially supported thereon by center holes of the circular blades in the non-rotational state and are arranged so that surfaces of the circular blades lie on a single plane and a mechanism for moving said blade base toward and away from the continuous sheet and for moving said blade base parallel to said single plane a distance substantially corresponding to a separation of two mutually adjacent circular blades, said circular blades respectively forming half-cut line portions which connect to form the half-cut line in the width direction.

6. A blister packaging apparatus as claimed in claim 1 in which said thermoplastic resin sheet is a continuous sheet drawn out of a roll, said half-cutting part comprising a longitudinal direction half-cutting part for forming a half-cut line in a longitudinal direction of the continuous sheet and a width direction half-cutting part for forming a half-cut line in a width direction of the continuous sheet, said longitudinal direction half-cutting part comprising at least one first circular blade having a center hole thereof axially supported on the non-rotational state and moving at least one of said first circular blade and the continuous sheet so that out of blade portions constituting the blade of the first circular blade a blade portion making contact with the continuous sheet forms the half-cut line in the longitudinal direction, said width direction half-cutting part comprising at least one second circular blade having a center hole thereof axially supported in the non-rotational state and moving said second circular blade in the width direction of the continuous sheet so that out of blade portions constituting the blade of the second circular blade a blade portion making contact with the continuous sheet forms the half-cut line in the width direction.

* * * * *

UNITED STATES PATENT AND TRADEMARK OFFICE
CERTIFICATE OF CORRECTION

PATENT NO. : 4,750,318

DATED : June 14, 1988

INVENTOR(S) : KOZABURO MATSUZAWA

It is certified that error appears in the above-identified patent and that said Letters Patent is hereby corrected as shown below:

On the Title Page, at Item "[30]", the second reference, delete "61-24871" and substitute therefor --61-243870--

Column 10, line 52, delete "122a." and substitute therefor --122a1--

Signed and Sealed this

Twenty-fifth Day of July, 1989

Attest:

DONALD J. QUIGG

Attesting Officer

Commissioner of Patents and Trademarks